May 18, 1943     B. DICK     2,319,392
SEAL CONSTRUCTION
Filed Aug. 22, 1942
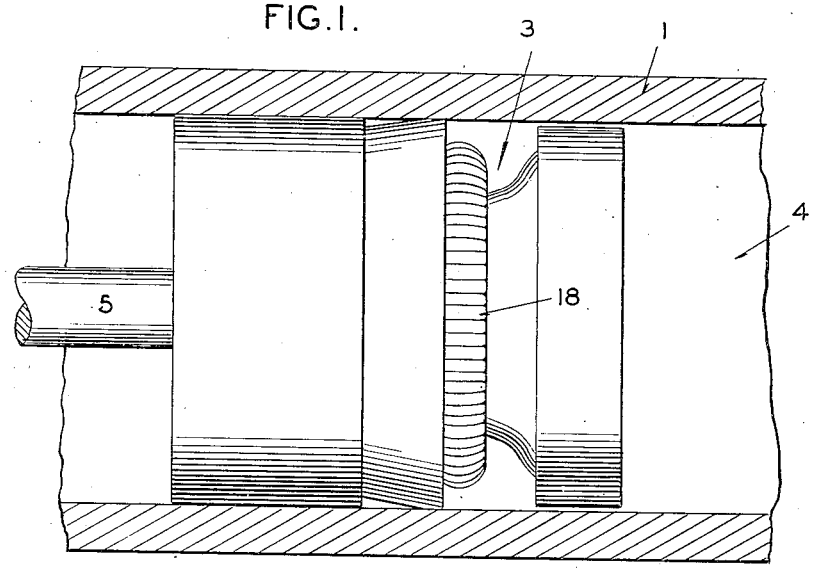
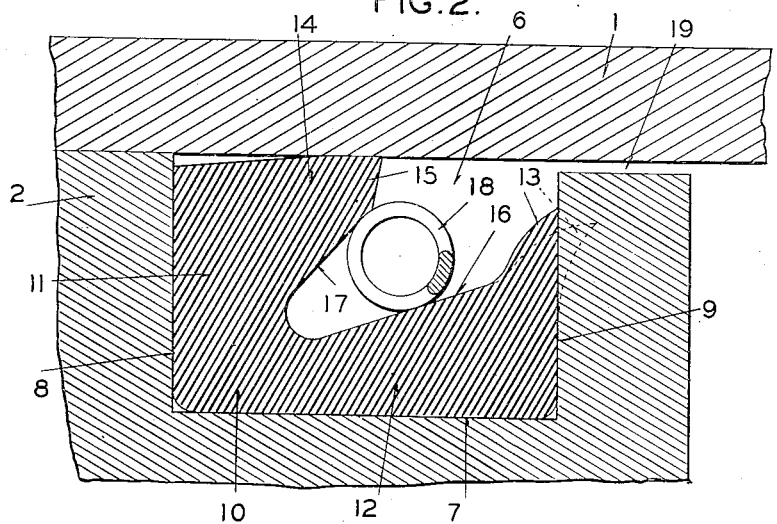
INVENTOR
BURNS DICK
BY
ATTORNEY

UNITED STATES PATENT OFFICE 2,319,392

SEAL CONSTRUCTION

Burns Dick, Ferguson, Mo., assignor to Wagner Electric Corporation, St. Louis, Mo., a corporation of Delaware Application August 22, 1942, Serial No. 455,703

6 Claims. (Cl. 309—34)

My invention relates to seals and more particularly to improved means for maintaining a lip of a seal in proper sealing contact with a coperating surface.

One of the objects of my invention is to so construct a seal and associate therewith an annular resilient element that a sealing lip of the seal will be properly maintained in pressure contact with a cooperating surface.

Still a more specific object of my invention is to so associate an annular coil spring with an annular U-shaped cross section type of seal that the sealing parts thereof will be maintained in proper pressure contact with the surfaces they engage.

Other objects of my invention will become apparent from the following description taken in connection with the accompanying drawing in which Figure 1 is a view of a piston and cylinder construction having associated therewith a seal embodying my invention; and Figure 2 is an enlarged sectional view of the seal, piston, and cylinder, said view being taken on a radial line of the piston.

Referring to the drawing in detail and first to Figure 1, the numeral 1 indicates a cylinder in which is reciprocable a piston 2 having associated therewith my improved seal construction generally indicated by the numeral 3. This seal is employed to prevent fluid under pressure in the portion 4 of the cylinder ahead of the piston from passing between the piston and the cylinder wall. The fluid in the cylinder may be placed under pressure by actuating the piston through piston rod 5, or said fluid may be placed under pressure by some other means and employed to move piston 2 to actuate another member which is connected to the piston by piston rod 5.

As best shown in Figure 2, the piston is provided with an annular groove 6 having a bottom wall 7, a rear wall 8, and a forward wall 9. Within this groove is positioned an annular packing cup 10 of general U-shaped radial cross section and formed of a suitable material such as rubber, synthetic rubber, rubberoid fabric, and so forth. The annular body 11 of this cup lies adjacent the rear surface 8 of the groove and has integral therewith an annular leg portion 12 which extends forwardly along the bottom surface 7 of the groove. The forward end of this leg is provided with an annular lip portion 13 for engaging the surface 9 of the groove and thus prevent fluid from entering between leg 12 and the bottom of the groove. This lip is originally formed as indicated in dotted lines so that when the seal is placed in the groove the lip will be flexed rearwardly and thus cause it to have pressure engagement with surface 9.

The body of the seal is also provided with a second integral annular leg portion 14 which is formed with a sealing lip portion 15 adjacent its outer end for engaging the surface of the cylinder to provide a seal for preventing fluid under pressure from passing the piston along the cylinder wall. The leg 14 and the lip are moulded so that the lip is slightly larger in diameter than the cylinder.

In a seal such as the one just described, fluid always engages lips 13 and 15 due to the fact that there is considerable clearance between the portion of the piston ahead of the groove and the cylinder wall, as indicated by the numeral 19. This fluid is always under pressure when the fluid in the cylinder is under pressure and is thus effective to maintain the lips in proper pressure contact with the surfaces engaged. However, when the fluid is not under pressure, lip 15 may not properly engage the cylindrical surface with sufficient pressure to prevent leakage, particularly when the material of the seal becomes deteriorated. In order to overcome the possibility of lip 15 failing to perform its intended function at all times, I have provided means which will maintain a proper pressure on the inner portion of lip 15 and, therefore, the lip will be held in pressure contact with the cylindrical surface at all times.

In accordance with my invention the inner adjacent surfaces 16 and 17 of legs 12 and 14, respectively, are so formed in relation to each other that they converge toward the body of the seal to provide an annular V-shaped groove with surface 16 at a slight acute angle with the axis of the piston.

For cooperation with surfaces 16 and 17 forming the groove, there is provided a garter spring 18, that is, an annular coiled spring. This garter spring is so constructed as to have such a normal inner diameter that it must be in expanded condition when placed in operative position in the V-shaped groove of the seal, the diameter of the coils of the spring being such that the spring will engage surfaces 16 and 17 a considerable distance from the bottom of the groove. The spring will act as a wedge between surfaces 16 and 17 and consequently there will be produced a force which will act to hold lip 15 in engagement with the cylinder wall at all times. There will also be a force produced by the spring which will act to hold leg 12 in pressure engagement with the bottom surface 7 of the groove. The expanded condition of the spring, when placed in operative position, results in the diameter of each coil of the spring being slightly decreased. Thus when the spring is in operative position, the tendency of the coil to spring to contract to its normal condition also results in the tendency of each of the coils to expand and thereby produce a pressure upon legs 12 and 14. Thus regardless of whether there is any wear of lip 15 or breakdown of the resiliency of the material of the seal, the lip will, nevertheless, be held in proper pressure contact with the cylinder wall. The sloping surface 16 always insures that the spring will be in operative position.

Being aware of the possibility of modifications in the particular structure described herein without departing from the fundamental principles of my invention, I do not intend that its scope be limited except as set forth by the appended claims.

Having fully described my invention, what I claim as new and desire to secure by Letters Patent of the United States is:

1. In a seal for a piston and a cylinder, said seal comprising an annular portion associated with the piston and provided with a lip for engaging the cylinder wall, means positioned inwardly of the lip for establishing with the inner surface of the annular portion a V-shaped groove having its bottom portion remote from the lip, an an annular coiled spring positioned in the groove with opposed portions of each coil which forms the spring being in engagement with portions of the sides of the groove spaced from the bottom of said groove, said spring when in operative position being in expanded condition and the side wall of the groove engaged by the inner portions of the coils of the spring being at such angle to the axis of the piston that the spring will be forced toward the bottom of the groove and the axis of the piston by its tendency to contract.

2. In a seal for association with a cylinder and a piston reciprocable therein and provided with an annular recess, said seal comprising a body positioned in said recess and having annular portions forming a V-shaped groove with its bottom or closed portion closest to the axis of the piston, one of said portions engaging the bottom of the recess and the other portion being provided with a lip engaging the cylinder wall, and an annular resilient member of circular radial cross section positioned in the groove and of such cross sectional diameter as to engage the walls thereof at points spaced from the bottom of the groove, said resilient member being in expanded condition when in operative position and the wall of the groove on the portion of the seal engaging the recess having such an angle with the axis of the piston that the resilient member will be forced toward the bottom of the groove and the axis of the piston to thereby cause an outwardly directed force on the inner portion of the lip.

3. In a seal for association with a cylinder and a piston reciprocable therein and provided with an annular recess, said seal comprising a body positioned in said recess and having annular portions forming a V-shaped groove with its bottom or closed portion closest to the axis of the piston, one of said portions engaging the bottom of the recess and the other portion being provided with a lip for engaging the cylinder wall, and an annular coiled spring positioned in the groove and of such coil diameter as to engage the walls thereof at points spaced from the bottom of the groove, said coiled spring being in expanded condition when in operative position and the wall of the groove on the portion of the seal engaging the recess having such an acute angle with the axis of the piston that the spring will be forced toward the bottom of the groove and away from the lip to thereby cause an outwardly directed force on the inner portion of the lip.

4. In a seal for association with a cylinder and a piston reciprocable therein and provided with an annular recess of rectangular cross section, said seal comprising an annular body engaging the rear wall of the recess and having two integral annular portions, one of which extends along the base surface of the groove and is provided with a lip engaging the forward wall of the groove, and the other portion extending adjacent the cylinder wall and having a lip engaging said wall, the inner adjacent surfaces of the portions being so related as to provide an annular V-shaped groove with the surface on the first portion sloping at an angle to the axis of the seal toward the body of the seal, and an annular coiled spring positioned in the groove and of such a coil diameter as to be spaced from the bottom of the groove, said spring when in operative position being in expanded condition and the groove being so arranged that the spring will contract toward the axis of the piston and away from the cylinder wall engaging lip to thereby produce an outwardly acting force on the inner portion of said lip.

5. In a seal for association with two relatively movable members having cooperating cylindrical surfaces, said seal comprising an element carried by one member and having an annular portion provided with a lip engaging the cylindrical surface of the other member, means associated with the portion provided with the lip for establishing an annular V-shaped groove having its bottom or closed portion more remote in a radial direction from the surface engaged by the lip than its mouth portion, and an annular resilient member having a circular radial cross section positioned for cooperation with the wall surfaces of the groove at points spaced from the bottom thereof, said resilient member being in deformed condition and the walls of the groove which are engaged by the resilient member being so related to the axis of the member carrying the seal that the member will tend to assume its normal condition and be drawn toward the bottom of the groove and away from the surface the lip engages to produce a wedging action and a force acting to maintain the lip in pressure contact with the surface it engages.

6. In a seal for association with two relatively movable members having cooperating cylindrical surfaces, one of which is provided with an annular recess therein, said seal comprising an annular member of resilient material positioned in said recess of one member and provided with an annular leg portion having a lip for engaging the surface of the other member and also provided with a second annular leg portion for engaging the bottom of the recess, the leg portions being formed to provide by their inner adjacent surfaces a V-shaped groove with both surfaces thereof at acute angles to the axis of the annular seal and converging in a direction away from the surface engaged by the lip so that the bottom portion of the groove is more remote from said lip than the mouth portion, and an annular coiled spring cooperating with the surfaces of the V-shaped groove at points spaced from the bottom thereof and being maintained at a greater internal diameter than its normal diameter to thereby produce a force as a result of its tendency to contract in a direction away from the lip which will act to cause the lip to be in pressure contact with the surface it engages.

BURNS DICK.